April 4, 1939. W. L. WOLFORD Re. 21,044
BINDER FOR RECEIPTS AND THE LIKE
Original Filed Feb. 3, 1936
FIG. 1
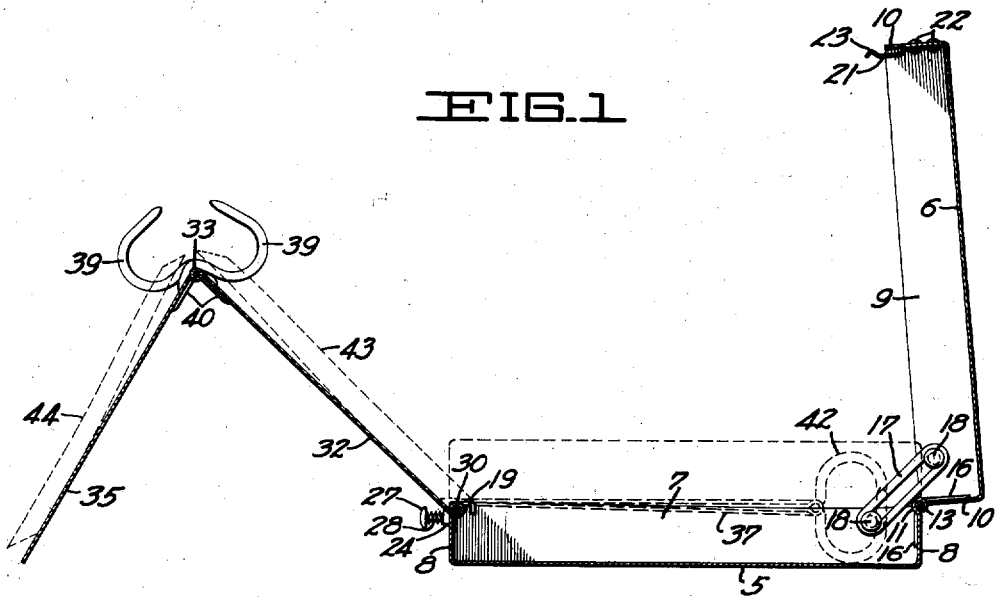
FIG. 2
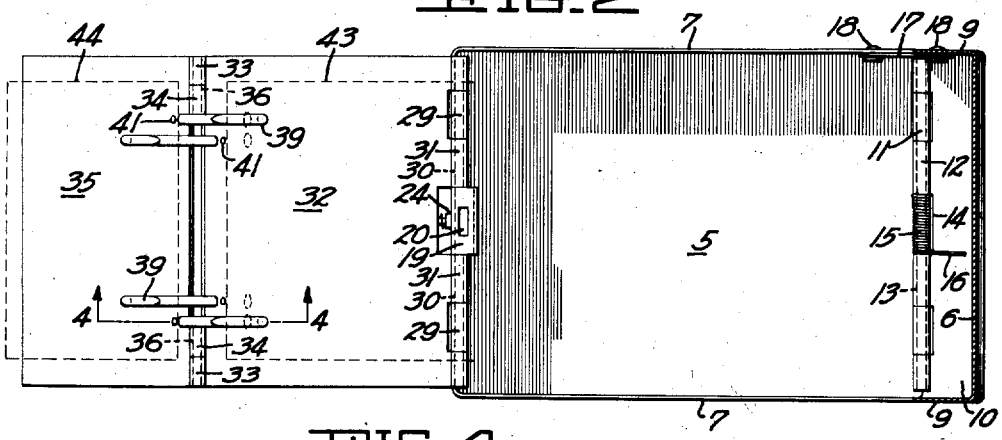
FIG. 4
FIG. 3
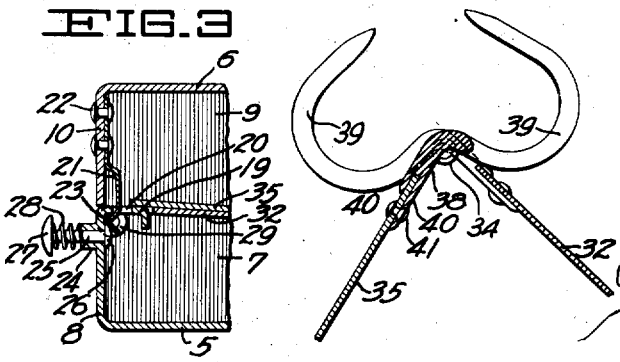
INVENTOR
Walter L. Wolford
BY
Harry R. Schroeder
ATTORNEY Reissued Apr. 4, 1939

Re. 21,044

UNITED STATES PATENT OFFICE 21,044

BINDER FOR RECEIPTS AND THE LIKE

Walter L. Wolford, Oakland, Calif.

Original No. 2,072,471, dated March 2, 1937, Serial No. 62,129, February 3, 1936. Application for reissue September 18, 1937, Serial No. 164,501

7 Claims. (Cl. 129—1)

This invention relates to binders for holding sheets of paper such as receipts, sales slips and the like.

It is an object of the invention to provide an improved binder in which receipts or the like may be kept and protected against loss or damage.

The broader aspects of the invention may be readily understood by referring to the accompanying drawing, in which:

Figure 1 is a vertical sectional view taken longitudinally through the binder of my invention.

Figure 2 is a top plan view of the binder; a portion of the lid being broken away to better disclose the hinge construction therefor.

Figure 3 is an enlarged vertical sectional view showing the latch.

Figure 4 is an enlarged vertical sectional view showing the method of mounting the clips.

The binder of my invention is particularly valuable to truckmen, especially those who must, during the course of the day, make a considerable number of deliveries and, consequently, must handle a large number of delivery receipts. The practice generally followed by most truckmen, is to carry these receipts on their person, usually in their pockets. It is not infrequent that some or all of these receipts will be lost, which, if acknowledgement of delivery has been endorsed thereon, and the loss becomes known to an unscrupulous customer, will enable the customer to deny that delivery has been made since the person who shipped the goods has no proof, other than the word of the truckman, that delivery has been made.

Another undesirable feature connected with the practice of carrying the receipts in the manner above described is that, if the truckman is required to handle goods which are grimy or greasy, such as machine parts or the like, the receipts are very likely to become soiled to such an extent that often the written information thereon is obliterated.

Another factor which contributes to the damage of these receipts is that in a great many instances the latter are written upon with indelible pencil which, if the receipts become wet by being exposed to rain, will cause stains which may obliterate other markings on the receipts.

To overcome these undesirable features I evolved the improved binder of my invention which will, by maintaining the receipts in a unit assembly, protect them against loss, which will protect them against becoming soiled or otherwise damaged, and which will, by providing separate storage spaces for the endorsed and un-endorsed receipts enable the truckman to find a desired receipt without the necessity of sorting through an entire group of the latter.

In detail, my binder comprises a container consisting of a bottom portion or tray 5 and a top portion or lid 6. The tray is provided with side walls 7 and end walls 8 and the lid has similar side and end walls 9 and 10 respectively. Portions of one end wall 8 and 10, of the tray and lid, are extended and looped to provide sleeves 11 and 12 through which is passed a pin 13. A central portion 14 of each end wall is cut away to clear a coiled spring 15 which is disposed about the pin 13 and has extensions 16 of each end convolution overlying and contacting the surfaces of the end walls. The structure just described provides a hinged mounting for the lid on the tray and the spring 15 serves to urge the lid to its raised position as shown in Figure 1.

Both the tray and lid are preferably constructed of thin sheet aluminum, for lightness, and to prevent opening of the lid beyond a desired amount, which might possibly strain the hinge and cause opening of the sleeves 11 and 12, I provide a stop in the form of a slotted link 17 which is slidably attached to the side walls 7 and 9 of the tray and lid respectively by headed rivets 18.

The end wall of the tray opposite to that upon which the lid hinge is formed is provided with an inturned lug 19 having an aperture 20 therein which receives the end of a resilient latch 21 secured by rivets 22 to the other end wall of the lid. As is shown in Figure 3, when the lid is closed the offset portion 23 of the latch engages under the portion of the lug 19 bordering the aperture 20 which securely holds the lid closed. To provide for ready release of the latch I have formed in the side wall of the tray, just below the lug, a sleeve 24 which slidably supports a rod 25 provided at its inner end with a head 26 which contacts the latch, and at its outer end with a push button 27. A coil spring 28 is interposed between the push button and the end of the sleeve so as to normally urge the rod 25 outwardly. When the push button is depressed the head 26 will move the offset portion of the latch out of engagement with the lug 19 and the lid will, under the influence of the spring 15, fly open.

The edge of the tray upon which the lug 19 is formed is also provided with extended portions which are looped to provide sleeves 29 for the reception of pins 30 which pins also engage sleeves 31 formed along the transverse edge of a plate 32. This plate, in the edge portion thereof which lies adjacent the lug 19 is cut away to provide clearance for the lug. The opposite transverse edge of the plate is also provided with looped extensions to provide sleeves 33 which together with similar sleeves 34 formed on the transverse edge of a sheet metal flap 35, receive pins 36, which structure provides hinges connecting the flap and plate. Since the plate 32 is hinged to the end wall of the tray, and the flap is hinged to the plate, it will be seen that the flap may be folded against the face of the plate and both swung about the axis of the hinge between the plate and tray to a position within the latter as is indicated by the dotted lines 37 of Figure 1.

The adjacent edges of the flap and plate are each notched to receive, as is shown in detail in Figure 4, the slotted end 38 of the U-shaped binder clips 39. The clips are formed of heavy wire and the slotting of the end 38 thereof provides a pair of spaced tines 40 of which one is longer than the other and is drilled to receive a rivet 41 which also passes through the body of the flap or plate to which the clips are attached. The clips are so formed that, when the flap and plate are moved to substantially the relative positions thereof shown in Figures 1 and 4 the bend of the clip, where the end 38 thereof joins the U-shaped portion, will contact the edge of the adjoining plate and will limit movement of the plates outwardly beyond this position. When the plates are in this position the clips 39 will be open and the binder may be rested on a table or other support to enable the user to insert papers in the binder or to remove papers therefrom. It will be seen that movement of the flap 35 to a position contacting the surface of the plate will close the clips 39 and provide a pair of closed loops, shown by the dotted lines 42 of Figure 1, which will securely hold the papers against separation.

When the folded flap and plate are moved into the position indicated within the container, it will be observed that the clips hold them in spaced relationship with the bottom of the tray providing room for the storage of executed or endorsed orders or receipts 43 thereby separating these papers from the group of unexecuted or unendorsed orders or receipts 44.

It will be seen from the foregoing that I have provided an improved binder, for the uses described, which will greatly reduce the likelihood of loss of memorandum sheets therefrom; which will protect the sheets against becoming so soiled or damaged as to obliterate information contained thereon; and which will save considerable time for the workman by providing for segregation of the used and unused sheets and obviating the necessity of the workman having to search through an entire group of papers before finding the one required.

I claim:

1. A binder for sheets of paper comprising a pair of opposed hollow sections hinged together along an edge thereof and movable into adjacent relationship to provide a closed container, a plate of sheet material pivotally mounted on an edge of one of said sections, said plate having mounted on an edge thereof U-shaped elements, a flap of sheet material hinged to said plate along the edge thereof carrying said U-shaped elements, said flap being also provided with U-shaped elements cooperative, when said flap is moved relative to said plate, with the U-shaped elements of said plate to provide a closed loop for supporting sheets of paper, said flap and plate being movable from positions exterior of said container to positions therewithin.

2. A binder for sheets of paper comprising a pair of opposed hollow sections hinged together along an edge thereof and movable into adjacent relationship to provide a closed container, a plate of sheet material pivotally mounted on an edge of one of said sections, said plate having mounted on an edge thereof U-shaped elements, a flap of sheet material hinged to said plate along the edge thereof carrying said U-shaped elements, said flap being also provided with U-shaped elements movable, when said flap is moved relative to said plate, into overlapped relationship with said other U-shaped elements to provide a closed loop for supporting sheets of paper, and said flap and plate being movable from positions exterior of said container to positions therewithin.

3. A binder for sheets of paper comprising a pair of opposed sections connected together along an edge thereof and movable into adjacent relationship to provide an enclosure, a plate of sheet material connected to one of said sections, said plate having mounted on an edge thereof U-shaped elements, a flap of sheet material hinged to said plate along said edge thereof carrying said U-shaped elements, said flap being also provided with U-shaped elements cooperative, when said flap is moved relative to said plate, with the U-shaped elements of said plate to provide a closed loop for supporting sheets of paper, said flap and plate being movable from positions exterior of said enclosure to positions therewithin.

4. A binder for sheets of paper or the like, comprising a pair of enclosure portions attached along adjacent parts, and movable into opposed folded relation to provide an enclosure, a stiff plate connected at one edge to one of said portions at a part spaced from said first mentioned parts, a stiff flap pivotally connected to said plate at an edge opposite to the edge connected to said enclosure portion, and loose sheet binder prongs provided on said plate and flap at their connected edges, said flap and plate being movable from positions exterior of said enclosure to positions therewithin.

5. A binder for sheets of paper and the like comprising a pair of sheet supporting plates connected together to permit the plates to be moved from superposed relation to angular relation, and means including prongs positioned for holding sheets on each of said plates automatically to prevent the release of the sheets from the plates when the latter are in said superposed relation and permitting said release when the plates are in angular relation.

6. A binder for sheets of paper and the like comprising a pair of sheet supporting plates hinged together at one edge to permit relative angular displacement of said plates, U-shaped paper holding elements provided on each of said plates adjacent the connected edge, and formed and positioned on said plates whereby when said plates are in parallel superposed relation the elements of the different plates will cooperate to provide a substantially closed loop and when said plates are in angular relation said elements will provide an open loop.

7. In a sheet binder of the character described, the combination with a pair of sheet supporting plates hingedly connected together adjacent one edge to permit the plates to lie in substantially adjacent parallel superposed planes or in angular relation, loose leaf sheet supporting prongs provided on said plates adjacent said edges and formed whereby said prongs are closed holding said sheets against removal when said plates are in parallel relation and open permitting removal of said sheets when said plates are in angular relation; an enclosure for covering said plates, when in said parallel relation and comprising enclosure portions hingedly connected to one of the free edges of one of said plates for movement about an axis parallel to the hinge axis of said plates, said portions being of such size and form and having a hinged connection between them about an axis parallel to said other axes, whereby when said plates are moved together in parallel relation and between said enclosure portions said portions may substantially enclose the plates.

WALTER L. WOLFORD.